United States Patent Office 3,547,862
Patented Dec. 15, 1970

3,547,862
EMULSION POLYMERIZATION PROCESS UTILIZING A HALOESTER AND CUPROUS SALT CATALYST SYSTEM
James D. Brown, Bartlesville, Okla., assignor to Phillips Petroleum Company, a corporation of Delaware
No Drawing. Filed Jan. 20, 1967, Ser. No. 610,466
Int. Cl. C08f 7/04; C08d 1/12
U.S. Cl. 260—93.5
6 Claims

ABSTRACT OF THE DISCLOSURE

A process and the catalyst for the emulsion polymerization of an organic monomeric material having an active vinyl group such as 1,3-butadiene by dispersing the monomeric material in an aqueous medium and then contacting the dispersed monomeric material with a catalyst formed by admixing an ester of a halogenated carboxylic acid with a cuprous salt such as ethyltrichloroacetate and cuprous chloride.

---

This invention relates to the emulsion polymerization of organic compounds. In one aspect it relates to the emulsion polymerization of monomers containing an active vinyl configuration. In another aspect it relates to a haloester and a cuprous halide polymerization catalyst system for the emulsion polymerization of monomers containing an active vinyl configuration.

The polymerization of monomeric material in aqueous emulsion is well known in the art. Numerous recepes have been developed for carrying out emulsion polymerization reactions to yield products possessing rubber-like characteristics. A constant search is being made to provide catalyst systems which produce higher yields of polymers of unsaturated organic compounds capable of undergoing an addition polymerization to form high molecular weight polymers while at the same time providing control of the polymerization rates and the product produced.

An object of the invention is to provide a catalyst system for the polymerization of monomers containing an active vinyl moiety.

Other objects, advantages and features of the invention will be apparent to one skilled in the art from the accompanying discussion and disclosure.

In accordance with the invention I have discovered a process for the emulsion polymerization of monomers containing an active vinyl moiety utilizing a catalyst system formed by admixing esters of halogenated carboxylic acids and cuprous salts. Further according to the invention I have discovered a new catalyst system for the emulsion polymerization of monomers containing an active vinyl moiety which is formed on admixing esters of halogenated carboxylic acids and cuprous salts.

The esters of the halogenated carboxylic acids used in the practice of the invention are represented by the formula

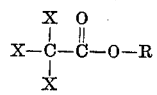

where X is a halogen chosen from fluorine, chlorine, bromine, iodine, and combinations thereof and R is an alkyl radical, an aryl radical, a cycloalkyl radical or combination thereof such as an aralkyl radical, n alkaryl radical, or the like, and the R radical contains from about 1–20 carbon atoms.

Preferred are the trihaloacetates wherein all the halogen atoms are the same and especially the trichloroacetates. Illustrative of compounds which can be employed in the practice of the present invention are methyl trichloroacetate, ethyl tribromoacetate, isopropyl trifluoroacetate, tert-butyl triiodoacetate, n-octyl dibromochloroacetate, n-decyl dichlorofluoroacetate, 1 - ethyl - 1 - n - propylheptyl chlorodiiodoacetate, n - pentadecyl trichloroacetate, n-eicosyl trichloroacetate, cyclopentyl trichloroacetate, cyclohexyl trichloroacetate, phenyl trichloroacetate, 1-naphthyl trichloroacetate, 2-naphthyl trichloroacetate, cyclopentylmethyl trichloroacetate, 7 - cyclohexylheptyl trichloroacetate, benzyl trichloroacetate, 3,4-diphenylbutyl trichloroacetate, 2-methylcyclopentyl trichloroacetate, 3,4-di-n-butylcyclopentyl trichloroacetate, 2,3,4 - tri-n-pentylcyclopentyl trichloroacetate, 4-methylcyclohexyl trichloroacetate, 2,4,6-triisopropylcyclohexyl trichloroacetate, 4-n-dodecylcyclohexyl trichloroacetate, 4 - phenylcyclohexyl trichloroacetate, 4 - tetradecylphenyl trichloroacetate, 4-methylphenyl trichloroacetate, 2,4,6 - triethylphenyl trichloroacetate, 3,5 - di - n - butylphenyl trichloroacetate, 4-cyclohexylphenyl trichloroacetate, and the like.

The cuprous salts as used in the present invention are such as are included in a Lewis definition of the term salt. The anionic moiety of the cuprous salt can be any inorganic anion, such as $Cl^-$, $Br^-$, $F^-$, $I^-$, $S^=$, $PO_4^\equiv$, $SO_4^=$, $H_2PO_4^-$, $HPO_4^=$, $HSO_4^-$, $CO_3^=$, $O^=$, and the like provided that the inorganic anion does not interfere with free radical type reactions. Organic anions can also be used as the anionic moiety of the cuprous salts. The organic anions can be chosen from groups such as

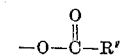

where R' is alkyl, cycloalkyl, aryl, and combinations thereof such as aralkyl, cycloalkalkyl, and the like provided that the total carbon atoms for the molecule do not exceed 25. Other anions such as sulfonyl, phosphonyl, and the like can also be employed as the anionic moiety of the cuprous salts provided that the anionic moiety of the salts does not contain more than 20 carbon atoms and is of the type that does not normally interfere with free radical type reactions.

The catalyst systems of the present invention have found utility in emulsion polymerization systems of the oil-in-water type as are well known to the art. Cationic emulsifiers such as cetylbenzyldimethyl ammonium chloride, and nonionic emulsifiers such as 1-(omega-hydroxynonacosapoly - ethoxylene-p-phenylene)-2,2,3,3-tetramethylbutane are preferred although anionic emulsifiers such as lauryl alcohol sulfate can also be employed.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxy-styrene, alpha-methyl-styrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethynyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene), styrene and isoprene. The invention will, therefore, be more particularly discussed and exemplified with reference to these typical reactants.

The polymerization of the present invention can be carried out in conventional equipment and by techniques which are well known to the art.

In accordance with the present invention temperatures may range from about —40° F. to about 170° F. with temperatures from about 25° F. to about 160° F. usually preferred. Obviously when polymerizations are carried out in aqueous emulsions in the absence of freezing point depressants, temperatures below the freezing point of water cannot be employed. The use of various additives however makes a process of the type disclosed herein applicable at lower temperatures. Inorganic salts and alcohols can be used for lowering the freezing point of the water. An example of such a low temperature system is a glycerine-water solution, and the term "aqueous emulsion" should be construed to include the use of an aqueous medium comprising water and a sufficient amount of a water-soluble component, preferably organic, to lower the freezing point below the desired polymerization temperature. A variety of modifiers, such as an alkyl mercaptan, dialkyl dixanthogens, diarylmono- and disulfides, tetraalkylthiuram mono- and di-sulfides, and mercaptothiazoles, can be used to advantage in the process of the present invention. After the desired polymerization has been achieved the polymerization reaction can be short-stopped and the polymer recovered by conventional methods well known in the art. In general, the catalyst system of this invention catalyzes emulsion polymerization reactions over a broad range of time, temperature, pressure and concentrations. Preferably, however, the temperature should be between 25° F. and 160° F., the amount of water employed is from about 100 to 600 parts by weight per 100 parts of monomer. The reaction time is between 0.5 and 25 hours, and the mol ratio of cuprous salt to haloester compound is within the range of 0.1:1 to 10:1, preferably within the range of about 0.15:1 to 5:1. The total catalyst system should comprise between 0.2 and 500 millimoles per 100 grams of monomer, preferably between 2 and 100 mhm. A pressure sufficient to maintain the polymerization reaction mixture substantially completely in the liquid phase is preferred, and pressures between 10 and 50 p.s.i. have been found very effective.

The polymers thus formed can be recovered by any conventional technique. For instance, such polymers can be coagulated with an alcohol, or a salt can be employed to coagulate the polymers from the latex formed. Of course, conventional methods can be employed to process the resultant polymers. If conditions and monomers are such that an elastomer is formed, conventional rubber processing methods such as blending with carbon black, extenders, stabilizers, and the like can be employed. Such elastomers can be cured by conventional methods. On the other hand, if the monomers and conditions are such that thermoplastics are formed as the polymers, conventional thermoplastic technology can be employed to process such polymers and fabricate them into familiar thermoplastic items of everyday utility. The latex per se can also be employed for such uses as a sticker for application of agricultural pesticides or as an additive to improve the strength of concretes.

The valuable polymers produced by the process of this invention can be employed as adhesives, plastics, sealants, surface coatings, and the like, and in the manufacture of tires, hose, gaskets, sponge, and the like.

The following examples, disclosing the general technique and recipes, demonstrate the utility of the polymerization process in accordance with the present invention. The reactants and their proportions and the specific ingredients are presented as being typical and should not be construed to limit the invention unduly.

General technique: The emulsifier and water mixture was charged to a glass reactor. The cuprous salt was weighed and added to the mixture in the reactor. The reactor was then sealed and flushed with nitrogen by pressuring the reactor to 25 p.s.i. with nitrogen and then evacuating the reactor at least 3 times. The monomer or monomers and the ethyl trichloroacetate component of the catalyst system were then charged to the reactor. The reactor was again pressured to 25 p.s.i.g. with nitrogen and the mixture within the reactor was then tumbled at a stated constant temperature for the desired reaction time. At the end of the reaction period 3 ml. of 0.4 M 2,6-di-tert-butylhydroquinone in isopropanol was used to short-stop the polymerization reaction. The contents of the reactor was then poured into anhydrous isopropanol and the isopropanol mixture was stirred to coagulate the polymer. The isopropanol phase was then decanted from the polymer. The polymer remaining was then dissolved in toluene and the toluene polymer solution filtered to remove undissolved solids. Three ml. of A02246 solution (0.1 g. of 2,2'-methylene-bis(4-methyl-6-tert-butylphenol)/ml. isopropanol solution) was then added to the toluene polymer solution as a stabilizer. Isopropanol was added to coagulate the polymer. The diluents were then removed from the polymer leaving a purified polymer. The polymer was then dried under vacuum at 60° C. for 16 hours. The runs in the following examples were made with one-tenth of the recipe amounts, i.e. 10 gm. of monomer.

EXAMPLE I

The runs reported in the following table were conducted by the general technique at a temperature of 122° F.

TABLE 1

|  | Run 1 | Run 2 | Run 3 | Run 4 | Run 5 |
|---|---|---|---|---|---|
| Monomer, parts by wt | Styrene, 100 | bd[1], 100 | Isoprene, 100 | bd, 75 / Styrene, 25 | bd, 25. Styrene, 75. |
| Water (p.h.m.)[4] | 200 | 400 | 500 | 400 | 400. |
| Emulsifier type | Dup-ME[2] | AM-T[3] | AM-T | AM-T | AM-T. |
| Emulsifier wt.[5] (p.h.m.) | 5 | 7.5 | 7.5 | 7.5 | 7.5. |
| $Cu_2Cl_2$ (m.h.m.)[6] | 60 | 9 | 9 | 6 | 6. |
| $Cl_3CCO_2Et$ (m.h.m.) | 60 | 4.5 | 4.5 | 3 | 3. |
| Time (hrs.) | 6 | 5 | 22 | 6 | 6. |
| Conversion (percent)[7] | 74 | 60 | 30 | 76 | 94. |

[1] bd—1,3-butadiene.
[2] Dup-Me—Duponol ME, a trademark for a sodium lauryl sulfate product.
[3] AM-T=Ammonyx-T, a trademark for a cetyl dimethyl benzyl ammonium chloride solution product (25% by wt. of active ingredient in $H_2O$ solution).
[4] P.h.m.=parts per hundred parts of monomer.
[5] Wt. is given as parts by weight of active component per 100 parts by weight of monomer(s).
[6] M.h.m.=millimoles/100 parts by weight of monomer(s).
[7] Conversion (percent)=g. of polymer recovered (100)/g. of monomer(s) charged.

This example clearly demonstrates that the catalyst systems of this invention are effective polymerizing agents for a variety of compounds containing an active vinyl moiety and for combinations thereof in aqueous emulsion systems.

EXAMPLE II

In the runs reported in the following table the emulsifier type was Dup-Me, emulsifier weight was 7.5 p.h.m., monomer was styrene, temperature was 122° F., and time was 22 hours.

TABLE 2

|  | Run 1 | Run 2 | Run 3 | Run 4 |
|---|---|---|---|---|
| Styrene, parts by wt | 100 | 100 | 100 | 100 |
| Water (p.h.m.) | 200 | 200 | 200 | 200 |
| $Cu_2Cl_2$ (m.h.m.) | 6 | 6 | 0 | 0 |
| $Cl_3CCO_2Et$ (m.h.m.) | 6 | 0 | 6 | 0 |
| Conversion (percent) | 64 | 0 | 4 | 0 |

This example clearly demonstrates the necessity for both components of the catalyst system.

EXAMPLE III

In the following runs the emulsifier type was AM-T, emulsifier weight was 7.5 p.h.m., monomer was butadiene, and temperature was 122° F.

TABLE 3

|  | Run 1 | Run 2 | Run 3 | Run 4 | Run 5 | Run 6 | Run 7 |
|---|---|---|---|---|---|---|---|
| Butadiene, parts by wt | 100 | 100 | 100 | 100 | 100 | 100 | 100 |
| Water (p.h.m.) | 400 | 400 | 400 | 400 | 400 | 400 | 400 |
| $Cu_2Cl_2$ (m.h.m.) | 6 | 6 | 6 | 6 | 6 | 12 | 18 |
| $Cl_3CCO_2Et$ (m.h.m.) | 1.5 | 3.0 | 6.0 | 12 | 30 | 6.0 | 6.0 |
| Time (hrs.) | 5 | 5 | 6 | 5 | 5 | 5 | 5 |
| Conversion (percent) | 30 | 26 | 50 | 35 | 39 | 52 | 18 |

This example demonstrates that the molar ratio of the two components of the catalyst system can be varied.

EXAMPLE IV

In the following runs the emulsifier type was AM-T, emulsifier weight was 7.5, monomer was butadiene, and temperature was 122° F.

This example demonstrates that copper salts are effective components of the catalyst system while salts of closely related metals are not effective. It also demonstrates that a halogenated ester is necessary in this catalyst system; other types of halogenated compounds tested were not effective.

TABLE 4

|  | Run 1 | Run 2 | Run 3 | Run 4 | Run 5 | Run 6 | Run 7 | Run 8 | Run 9 |
|---|---|---|---|---|---|---|---|---|---|
| Butadiene, parts by wt | 100 | 100 | 100 | 100 | 100 | 100 | 100 | 100 | 100 |
| Water (p.h.m.) | 400 | 400 | 400 | 400 | 400 | 400 | 400 | 400 | 400 |
| Metal salt type | (1) | (1) | (1) | (1) | (1) | (1) | (2) | (3) | (4) |
| Metal salt conc. (m.h.m.) | 12 | 12 | 12 | 12 | 12 | 10 | 10 | 10 | 10 |
| Halo compound | (5) | (6) | (7) | (8) | (9) | (5) | (5) | (5) | (5) |
| Halo cpd. conc. (m.h.m.) | 6 | 6 | 6 | 6 | 6 | 5 | 5 | 5 | 5 |
| Time (hrs.) | 5 | 5 | 5 | 5 | 5 | 6 | 6 | 6 | 6 |
| Conversion (percent) | 34 | 0 | 0 | 0 | 0 | 21 | 5 | 0 | 0 |

[1] $Cu_2Cl_2$.
[2] $Cu_2S$.
[3] $CoCl_2$.
[4] $FeCl_3$.
[5] $Cl_3CCO_2Et$.
[6] $CHCl_3$.
[7] 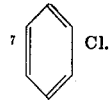 Cl.

[8] Allyl chloride.
[9] n-Butyl iodide.

EXAMPLE V

In the runs reported in the following table the emulsifier type was AM–T, emulsifier weight was 7.5 p.h.m., monomer was butadiene, temperature was 122° F., and time was 6 hours.

TABLE 5

| | Run 1 | Run 2 | Run 3 | Run 4 | Run 5 | Run 6 |
|---|---|---|---|---|---|---|
| Butadiene, parts by wt. | 100 | 100 | 100 | 100 | 100 | 100 |
| Water (p.h.m.) | 400 | 400 | 400 | 400 | 400 | 400 |
| $Cu_2Cl_2$ (m.h.m.) | | 6 | 7 | 7 | 6 | 7 |
| $Cl_3CCO_2Et$ (m.h.m.) | | | | | | 6.1 |
| $Cl_3CCO_2H$ (m.h.m.) | 12.0 | 1.59 | 3.24 | 6.86 | 12.5 | |
| Conversion (percent) | 0 | 1 | Trace | 0 | 0 | 31 |

From the above example it is clearly evident that the unexpected results obtained by the use of the haloester, as compared to those obtained by use of the halo acid, clearly demonstrate a new polymerization catalyst system.

Many modifications of this invention will be apparent to those skilled in the art upon a study of the accompanying disclosure. Such modifications, being clearly apparent from this disclosure are believed to be within the spirit and the scope of this invention.

I claim:
1. A process for the emulsion polymerization of at least one polymerizable monomer selected from among unsubstituted conjugated diolefins, halo-substituted diolefins, and monovinyl-substituted aromatic compounds, and mixtures thereof, which comprises:
   (a) preparing a catalyst composition comprising an admixture of (I) an ester of halogenated carboxylic acid

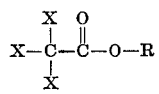

wherein X is a halogen atom selected from at least one of fluorine, chlorine, bromine, and iodine, and R has from 1 to about 20 carbon atoms and is selected from alkyl, aryl, cycloalkyl, and combinations thereof, and (II) a cuprous salt, wherein the anionic moiety of said cuprous salt is selected from $F^-$, $Cl^-$, $Br^-$, $I^-$, $S^=$, $PO_4^\equiv$, $HPO_4^=$, $H_2PO_4^-$, $SO_4^=$, $HSO_4^-$, $CO_3^=$, $O^=$, sulfonyl having up to about 20 carbon atoms, phosphonyl with up to about 20 carbon atoms, and

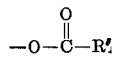

wherein R' is selected from the group consisting of alkyl, cycloalkyl, aryl, and combinations thereof and wherein the said R' has up to about 25 carbon atoms,
   (b) establishing and maintaining an emulsion comprising a dispersion of an aqueous phase, said monomer, an emulsifying agent, and the said catalyst composition from step (a), under emulsion polymerization conditions,
   (c) polymerizing said monomer and thereby producing a polymer, and
   (d) recovering said polymer as a product.

2. The process of claim 1 wherein said catalyst composition of said step (a) is prepared in situ in said emulsion of said step (b).

3. The process according to claim 1 wherein said polymerizable monomer is selected from butadiene, isoprene, and styrene.

4. The process according to claim 3 wherein said ester is a trihaloacetate and wherein said cuprous salt is selected from cuprous chloride and cuprous sulfide.

5. A process according to claim 4 wherein said emulsion polymerization conditions include a polymerization temperature in the range of about −40 to about 170° F., an aqueous phase concentration within the range of about 100 to about 600 parts by weight of water per 100 parts by weight of said monomer, the use of between about 0.2 and 500 millimoles of said catalyst composition per 100 grams of said monomer, and a polymerization pressure of from about 10 to about 50 p.s.i.

6. The process of claim 5 wherein said emulsion further contains an organic sulfur containing modifier in minor amount.

References Cited
UNITED STATES PATENTS

| 1,926,055 | 9/1933 | Nieuwland et al. | 252—429 |
| 2,380,474 | 7/1945 | Stewart | 260—94.3 |
| 3,114,737 | 12/1963 | Herman et al. | 260—93.5 |
| 3,118,001 | 1/1964 | Riemenschneider | 252—428 |

OTHER REFERENCES

Chemical Abstract, vol. 50, p. 9783.
Chemical Abstract, vol. 26, p. 3406.

JAMES A. SEIDLECK, Primary Examiner

U.S. Cl. X.R.

252—426, 428, 429; 260—63, 84.1, 88.3, 88.7, 89.1, 89.5, 91.1, 92.3, 94.3